United States Patent [19]

Portman et al.

[11] Patent Number: 5,636,055
[45] Date of Patent: Jun. 3, 1997

[54] FLIP SCREEN ASSEMBLY

[75] Inventors: John Portman, Anaheim; Alan Smith, Irvine, both of Calif.; Christopher Masters, Savannah, Ga.

[73] Assignees: Sony Corporation, Tokyo, Japan; Sony Trans Com Inc., Irvine, Calif.

[21] Appl. No.: 686,478

[22] Filed: Jul. 26, 1996

Related U.S. Application Data

[63] Continuation of Ser. No. 349,502, Dec. 2, 1994, abandoned.

[51] Int. Cl.⁶ .................................................. E06B 7/14
[52] U.S. Cl. ........................... 359/443; 359/503; 359/506
[58] Field of Search .................................. 359/443, 503, 359/506

[56] References Cited

U.S. PATENT DOCUMENTS

| | | | |
|---|---|---|---|
| 4,611,447 | 9/1986 | Krechel | 52/209 |
| 4,639,106 | 1/1987 | Gradin | 353/13 |

*Primary Examiner*—Safet Metjahic
*Assistant Examiner*—D. P. Malley
*Attorney, Agent, or Firm*—Blakely, Sokoloff, Taylor & Zafman

[57] ABSTRACT

A screen assembly that includes a screen material which is bonded to a thin metal substrate. The substrate is typically a solid 1/16 inch thick sheet of aluminum that is both light weight and strong. The bonded screen/substrate subassembly is mounted to an flip panel frame which is pivotally connected to an outer frame. To increase the rigidity of the substrate, the edges of the screen subassembly are located within a channel of the flip panel frame and held in place by a flexible foam cord that is pressed between the subassembly and the frame. The outer frame is pivotally connected to a stationary frame that is mounted to a structure, such as the wall of an aircraft passenger compartment. To display images on the screen, the outer frame is rotated away from the wall and the flip panel frame is flipped around to expose the screen to the passenger compartment.

5 Claims, 3 Drawing Sheets

FIG. 5
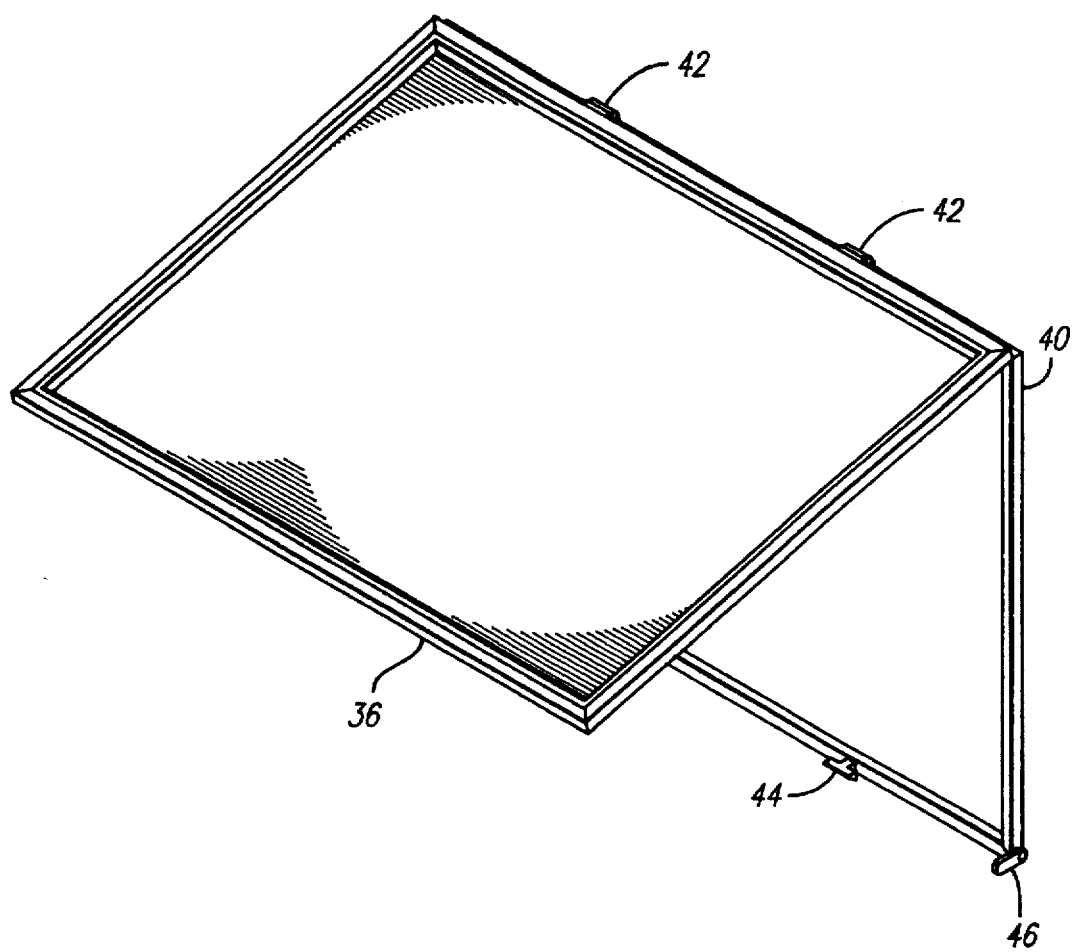
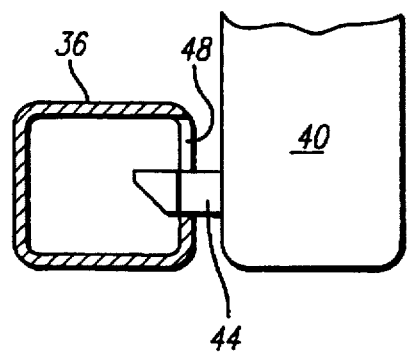
FIG. 6
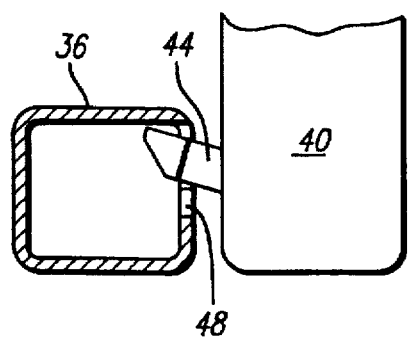
FIG. 7

FLIP SCREEN ASSEMBLY

This is a continuation application of application No. 08/349,502, filed 12/02/94, now abandoned.

BACKGROUND OF THE INVENTION

1. Field of the Invention

The present invention relates to a screen assembly for an image projection system.

2. Description of Related Art

Some large commercial aircraft have a projection system for showing movies, etc. A typical aircraft movie projection system will include a large screen located on a front wall of the passenger compartment. The screen may be located behind a retractable door or mounted to a frame that can be rotated 180° to expose the screen to the passengers. When not in use, the screen can be rotated to expose a back surface. The back surface of the screen may have a decorative material that matches the decor of the passenger compartment.

Screen material is typically weak and subject to damage. Therefore when incorporated with a rotating outer frame, it is desirable to mount the screen to a stiff substrate. Present screen substrates are constructed from a number of metal sheets combined in a "honeycomb" matrix. The metal layers of the honeycomb substrate are typically bonded together by an adhesive. It has been found that the amount of adhesive in the honeycomb material renders the overall screen assembly relatively flammable and that the assembly does not meet certain aircraft compartment interior flammability specifications. Therefore it would be desirable to provide a screen assembly that was durable, light in weight and less flammable than assemblies of the prior art.

SUMMARY OF THE INVENTION

The present invention is a screen assembly that includes a screen material which is bonded to a thin metal substrate. The substrate is typically a solid 1/16 inch thick sheet of aluminum that is both light weight and strong. The screen/substrate subassembly of the present invention contains less adhesive than screen subassemblies in the prior art and thus meets more stringent aircraft interior flammability requirements such as Federal Aviation Regulation 25.853, Amendment 25-66. The bonded screen/substrate subassembly is mounted to an flip panel frame which is pivotally connected to an outer frame. To increase the rigidity of the substrate, the edges of the screen subassembly are located within a channel of the flip panel frame and held in place by a flexible foam cord that is pressed between the subassembly and the frame. The outer frame is pivotally connected to a stationary frame that is mounted to a structure, such as the wall of an aircraft passenger compartment. To display images on the screen, the outer frame is rotated away from the wall and the flip panel frame is flipped around to expose the screen to the passenger compartment.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 5 is a perspective view showing a latch subassembly of the screen;

FIG. 6 is a cross-sectional view showing a latch in a latch position;

FIG. 7 is a cross-sectional view showing the latch in an unlatched position.

DETAILED DESCRIPTION OF THE INVENTION

Figure 1:
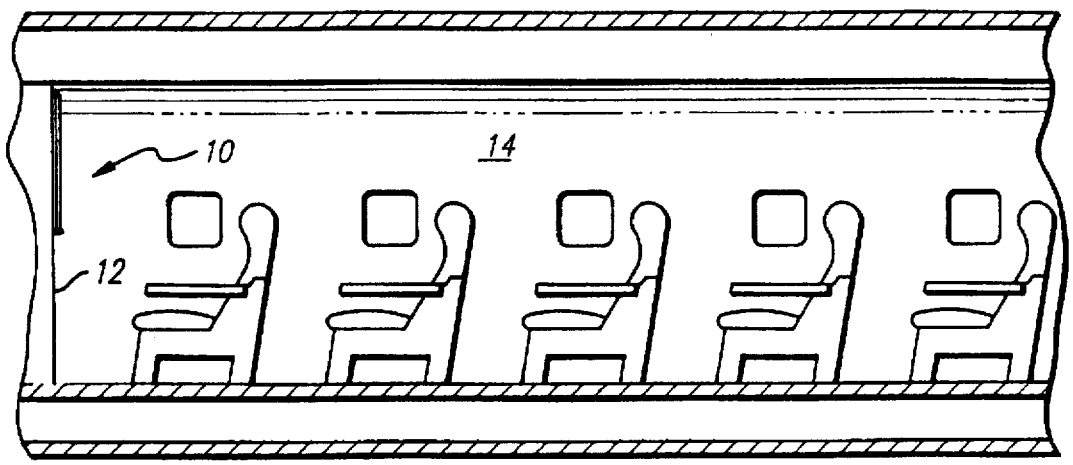
FIG. 1 is a perspective view of a screen assembly of the present invention located within the passenger compartment of an aircraft.

Referring to the drawings more particularly by reference numbers, FIG. 1 shows a screen assembly 10 of the present invention. The screen assembly 10 can be mounted to a wall 12 located in a passenger compartment 14 of an aircraft. The screen assembly 10 displays images projected by a projection systems (not shown) typically located on the ceiling of the passenger compartment 14.

Figure 2:
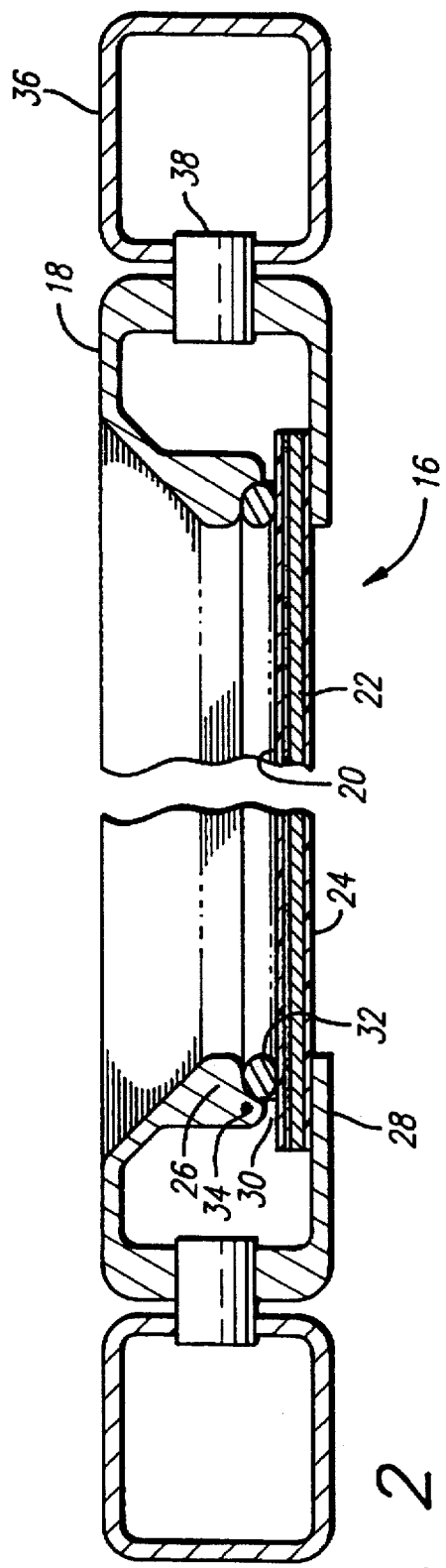
FIG. 2 is a cross-sectional view of a screen/substrate subassembly mounted to a frame.

FIG. 2 shows a screen/substrate subassembly 16 mounted to a flip panel frame 18 of the assembly 10. The subassembly 16 includes a reflective screen material 20 that is mounted to a metal substrate 22. In the preferred embodiment, the substrate 22 is a 1/16 inch thick solid sheet of aluminum. The subassembly 16 may also have a layer of decorative material 24 mounted to the substrate 22 opposite from the screen 20. By way of example, the decorative 24 may be wallpaper which matches the decor of the passenger compartment 14. The screen 20 and decorative 24 are preferably bonded to the substrate 22 with a layer of contact adhesive. The adhesive is typically 0.002 inches thick and has been found to meet aircraft compartment interior flammability requirements.

The flip panel frame 18 preferably has a C-shaped cross-section with a pair of fingers 26 and 28 that are separated by a channel 30. The channel 30 extends around the circumference of the frame 18 and has a width that is larger than the combined thickness of the screen 20, substrate 22 and decorative 24. Located between the finger 26 and the subassembly 16 is a flexible cord 32. The cord 32 presses the subassembly 16 into the finger 28 to firmly attach the subassembly 16 to the frame 18. The cord 32 is preferably constructed from a foam material such a neoprene. The deflection force of the chord 32 should be such that the foam material provides a reactive force that securely holds the subassembly 16 in place. Fixing the subassembly 16 at the edges increases the stiffness of the substrate 22.

To assemble the subassembly 16 to the frame 18, the subassembly 16 is initially placed into the channel 30. The chord 32 is then stretched and pressed into the channel 30 to push the subassembly 16 into the finger 28. Finger 26 may have a seat 34 that facilitates insertion of the cord 32. In the preferred embodiment, the cord 32 is provided as four separate pieces that extend along the four sides of the frame 18 to fully support the subassembly 16.

Figure 3:
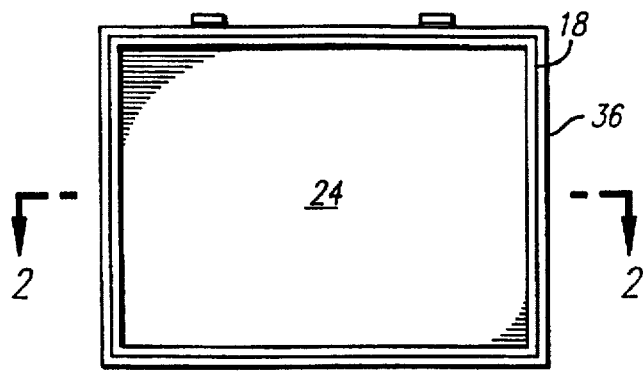
FIG. 3 is a front view of the screen assembly.
Figure 4:
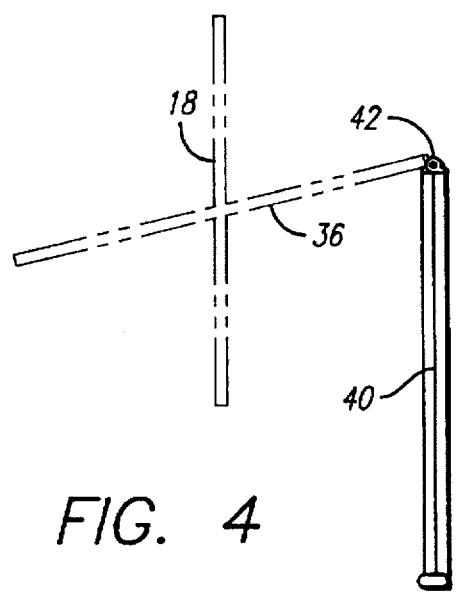
FIG. 4 is a side view of the screen assembly.

As shown in FIGS. 2, 3 and 4, the flip panel frame 18 is pivotally connected to an outer frame 36 by pins 38 located at the center of the frames. The pins 38 allow the flip panel frame 18 to be rotated relative to the outer frame 36 so that either the screen 20 or the decorative 24 can be exposed to the passenger compartment 14.

As shown in FIG. 5, the outer frame 36 is pivotally connected to a stationary frame 40 by hinges 42 located at the top portion of the frames 36 and 40. The stationary frame 40 is mounted to the wall 12. The hinges 42 allow the outer frame 36 to be rotated away from the wall 12 so that the flip panel frame 18 can be turned 180°. The stationary frame 40 may have a pair of latches 44 (FIG. 5) coupled to a pair of handles 46 located at the ends of the frame 40.

As shown in FIG. 6, the latches 44 extend into corresponding slots 48 within the outer frame 36 when the outer frame 36 is in a vertical position. The latches 44 prevent the outer frame 36 from moving relative to the stationary frame 40. The outer frame 36 can be rotated by turning the handles 46 so that the latches 44 clear the slots 48 as shown in FIG. 7.

When the screen 20 is not being utilized, the flip panel frame 18 exposes the decorative 24 to the passenger compartment 14 and the latches 44 maintain the position of the outer frame 36. To display images on the screen 20, the handles 46 are rotated upward and the outer frame 36 is pulled away from the wall 12. The flip panel frame 18 is then rotated 180° to expose the screen 20 to the passenger compartment. The outer frame 36 is then placed back into the vertical position and the handles 46 are rotated to lock the frame 36 in place.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A viewing screen assembly, comprising:

a stationary frame;

an outer frame pivotally connected to said stationary frame;

a flip panel frame pivotally connected to said outer frame, said flip panel frame having a finger that has an L-shaped seat;

a solid metal sheet;

a screen mounted to said metal sheet;

a layer of decorative material mounted to said metal sheet; and, a deflected flexible cord that is located within said L-shaped seat and is contiguous with said flip panel frame and said screen to press said sheet metal and said screen into said flip panel frame, wherein said L-shaped seat impedes a lateral movement of said deflected flexible cord, said screen and said metal sheet.

2. The screen assembly as recited in claim 1, further comprising a latch that couples and releases said outer frame from said stationary frame.

3. The screen assembly as recited in claim 1, wherein said flexible cord is constructed from a foam material.

4. A method for assembling a viewing screen, comprising the steps of:

a) attaching a screen to a solid metal sheet;

b) placing said metal sheet and said screen in a channel of a frame, wherein said channel is wider than a combined thickness of said metal sheet and said screen; and, c) inserting a flexible cord between said screen and said frame to press said screen and said metal sheet to said frame.

5. The method as recited in claim 4, further comprising the step of attaching a layer of decorative material to said metal sheet before step (b).

* * * * *